United States Patent Office 3,360,520
Patented Dec. 26, 1967

3,360,520
1,3,5,6-TETRASUBSTITUTED URACILS
Raymond W. Luckenbaugh, Wilmington, Del., and Edward J. Soboczenski, Chadds Ford, Pa., assignors to E. I. du Pont de Nemours and Company, Wilmington, Del., a corporation of Delaware
No Drawing. Original application May 1, 1964, Ser. No. 364,309, now Patent No. 3,235,363, dated Feb. 15, 1966. Divided and this application Dec. 27, 1965, Ser. No. 516,682
7 Claims. (Cl. 260—260)

This is a divisional application of co-pending application Ser. No. 364,309, now Patent No. 3,235,363, filed May 1, 1964 which in turn is a continuation-in-part of the following abandoned applications: application Ser. No. 241,141, filed Nov. 30, 1962; application Ser. No. 89,672, filed Feb. 16, 1961; and application Ser. No. 48,563, filed Aug. 10, 1960.

This invention relates to novel 1,3,5,6-tetrasubstituted uracils. More particularly, this invention is directed to uracil compounds of the formula (1) 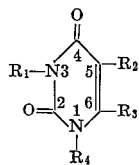

where $R_1$ is alkyl of 1 through 10 carbon atoms, phenyl, substituted phenyl, cycloalkyl of 3 through 12 carbon atoms, substituted cycloalkyl of 3 through 12 carbon atoms, cycloalkenyl of 4 through 12 carbon atoms, substituted cycloalkenyl of 4 through 12 carbon atoms;
$R_2$ is fluorine, chlorine, bromine, iodine, or methyl;
$R_3$ is methyl or ethyl;
$R_4$ is trichloromethylthio, or

wherein $R_5$ is hydrogen, alkyl of 1 through 9 carbon atoms, chloroalkyl of 1 through 4 carbon atoms, polychloroalkyl of 1 through 4 carbon atoms, phenyl, chlorophenyl of 1 through 3 chlorine atoms, benzyl, phenoxymethyl, or chlorophenoxymethyl of 1 through 3 chlorine atoms;

with the proviso that $R_2$ and $R_3$ by appropriate loss of hydrogen atoms from alkyl groups can become part of a $-(CH_2)_n-$ group to form a ring wherein $n$ is 3.

For $R_1$ the term "substituted phenyl" means phenyl substituted with a substitutent selected from the group consisting of chlorine, bromine, fluorine, trifluoromethyl and alkyl of 1 through 5 carbon atoms. Illustrative radicals of such term are:

chlorophenyl
bromophenyl
fluorophenyl
methylphenyl
sec-amylphenyl
trifluoromethylphenyl For Formula 1, radicals illustrative of the terms "cycloalkyl" and "cycloalkenyl" are:

cyclopropyl
cyclohexyl
cyclohexenyl
cyclopentyl
cyclopentenyl
norbornyl
norbornenyl
bicyclo (2,2,2) octyl
bicyclo (2,2,2) octenyl
cyclopropyl
cyclobutyl
cyclooctyl
cyclododecyl
cyclobutenyl
hexahydroindanyl
tetrahydroindanyl
hexahydroindenyl
hexahydro-4,7-methanoindenyl
tetrahydro-4,7-methanoindanyl
hexahydro-4,7-methanoindanyl
decahydronaphthyl
tetrahydronaphthyl
decahydro-1,4-methanonaphthyl
octahydro-1,4-methanonaphthyl
decahydro-1,4-5,8-dimethanonaphthyl
octahydro-1,4-5,8-dimethanonaphthyl
fenchyl, and
bornyl The cycloalkyl or cycloalkenyl radical representing $R_1$ in Formula 1 may be substituted with a substituent selected from the groups consisting of alkyl containing 1 through 4 carbon atoms and methoxy.

$R_4$ is shown as attached to the uracil ring in the 1-position. This is done with the understanding that instead it might be attached to the oxygen in the 2-position. Evidence on this point is inconclusive.

The uracils of Formula 1 are prepared by the reaction of 3,5,6-substituted uracil starting materials with various reactants, as described herein.

The 3,5,6-substituted uracil starting materials can be prepared according to methods described in application Ser. No. 217,521, now Patent No. 3,235,357, filed Aug. 17, 1962, and application Ser. No. 232,311, now Patent No. 3,235,360, filed Oct. 22, 1962, both of which are assigned to our assignee.

These 3,5,6-substituted uracil starting reactants are converted into the compounds of Formula 1 by substitution reactions as described below.

In many cases, the substituted uracil starting materials can be reacted with acylating reactants directly, without use of a solvent or catalyst. It is usually preferable however, to use a solvent, because it facilitates handling of material, moderates the reaction, and aids in maintaining the desired reaction temperatures.

It is sometimes necessary to use an equivalent amount of a base such as sodium hydroxide to promote the reaction. When sodium hydroxide is used as a base catalyst, the reactions can be carried out in water. When bases such as sodium hydride are used, the reaction must be carried out in an anhydrous system such as dioxane, toluene, benzene, or xylene.

The uracils which bear a trichloromethylthio group in the 1-position can be prepared according to the following illustrative equation:

(2)

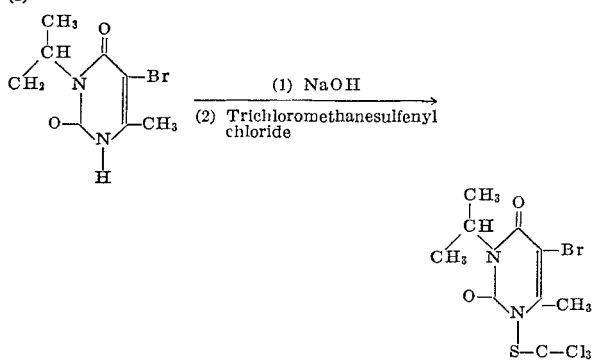

The uracil produced according to this equation precipitates almost immediately upon addition of trichloromethanesulfenyl chloride to the aqueous alcoholic solution of the uracil sodium salt. This method is outlined in greater detail in U.S. Patent 2,553,770.

The uracils substituted in the 1-position with an acetyl group can be prepared by treating a solution of a subsituted uracil starting material in acetone with ketene according to the following illustrative equation:

(3)

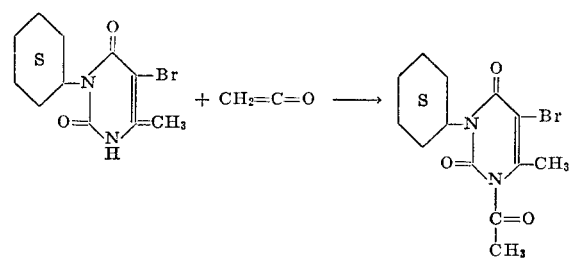

This reaction is usually rapid and exothermic.

The substituted uracil starting materials also react with acid chlorides to give uracils substituted in the 1-position. This reaction is illustrated by the following equation:

(4)

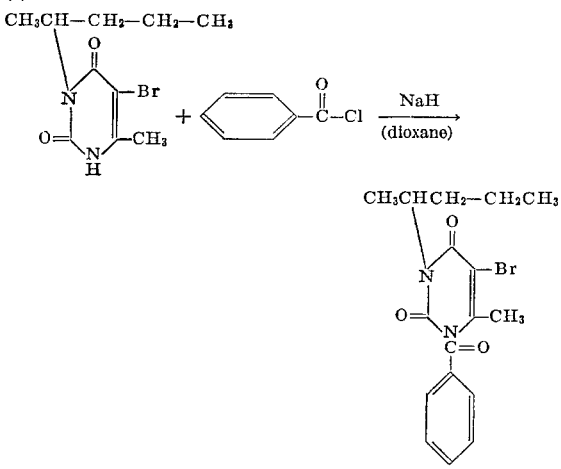

In many cases it is convenient to react the dry uracil sodium salt with the acid chlorides directly, utilizing an excess of the acid chloride as a solvent to moderate the reaction. The sodium salt may be prepared by dissolving the uracil in water or a mixture of water and alcohol containing an equivalent of sodium hydroxide, and evaporating the solution to dryness. The reaction between the sodium salt of the uracil and the acid chloride takes place conveniently at the refluxing temperature of the acid chloride. The reaction time is particularly short when the temperature is in the range of 150–230°.

On cooling the product generally crystallizes and may be washed free of excess acid chloride with such solvents as cyclohexane, carbon tetrachloride or pentane. Alternatively the excess acid chloride may be distilled off at reduced pressure. The inorganic salts are washed away with water and the product may be recrystallized from nitromethane, chlorethene, alcohol, cyclohexane or acetonitrile.

The compounds of this invention are useful as herbicides. They exert their action against both broadleaf and grass weeds, being effective against hard-to-kill nutsedge and perennial grasses such as quack grass, Johnson grass, and Bermuda grass, and on highly adsorptive substrates such as railroad ballast, heavy clay soil, and soils high in organic matter.

These properties make the compounds useful wherever general weed control is required. They can be used for example to control weeds in industrial areas, railroad rights-of-way, and areas adjacent to croplands in agricultural areas.

Certain of these compounds also exhibit selective herbicidal action in crops. By properly selecting a compound of the invention and a rate and time of application, annual grass and broadleaf seedlings in such crops as cotton, carrots, asparagus, corn, flax, sugar cane, pineapple, safflower, peanuts, citrus, alfalfa, strawberry and gladiolus can be controlled.

By proper selection of rate and time of application, certain of the compounds can also be used to control weeds growing in dormant crops.

Many of the compounds have unusually high oil solubility, and so are useful for application in oils such as herbicidal oils, diesel oil, kerosene, xylene, and other commercially available spray oils. High oil solubility makes shipment of uracil oil "concentrates" practical. Such concentrates can be diluted with low-cost diesel oil and herbicidal oils at the site of application.

The precise amounts of the compounds to be used in any given situation will, of course, vary according to the particular end result desired, the use involved, the plant and soil involved, the formulation used, the mode of application, prevailing weather conditions, foliage density and like factors. Since so many variables play a role, it is not possible to indicate a rate of application suitable for all situations. Broadly speaking, the compounds are used at levels of about ¼ pound per acre to about 80 pounds per acre.

When they are used in pre-emergence treatments, these compounds are used at concentrations of from ¼ to 5 pounds of active ingredient per acre.

When used in soil-foliage applications, they are used at concentrations of from 4 to 80 pounds of active ingredient per acre.

For selective weed control in crops, rates of ¼ to 8 pounds per acre will generally be used.

More of the active material can, of course, be used to control difficult-to-kill species growing under adverse conditions. Economic factors, such as inaccessibility of the area to be treated, e.g., fire breaks in forests, may also favor higher rates, with less frequent treatments. The compounds of this invention are also useful for the control of aquatic weeds, including algae.

The compounds of this invention also absorb ultraviolet light strongly. In addition to the strong end absorption the compounds show an absorption maximum about 270 m$\mu$. This makes the compounds useful as ultraviolet screening agents. When milled into a vinyl plastic, they absorb the ultraviolet radiation thus reducing the rate of deterioration of the plastic by sunlight.

The compounds of the invention can be used with a carrier or diluent such as a finely divided solid, a solvent liquid of organic origin, a non-solvent liquid of organic origin, water, a wetting agent, a dispersing agent, an emulsifying agent, an aqueous emulsion or any suitable combinations of these.

These compositions, especially liquids and wettable powders, contain as a conditioning agent one or more surface-active agents in amounts sufficient to render a given composition containing the uracils readily dispersible in water or in oil. By the term "surface-active agent," it is understood that wetting agents, dispersing agents, suspending agents and emulsifying agents are included.

Suitable surface-active agents are set out, for example, in Searle U.S. Patent 2,426,417, Todd U.S. Patent 2,655,447, Jones U.S. Patent 2,412,510, or Lenher U.S. Patent 2,139,276. A detailed list of such agents is set forth in "Detergents and Emulsifiers Annual 1965" by John W. McCutcheon, Inc. In general, less than 10 percent by weight of the surface-active agent is present in the composition although usually the amount of surface-active agent is not more than 5 percent by weight. However, levels as high as 4 parts of surfactant for each part of uracil gives unusual and unexpected beneficial results. Such compositions have greater herbicidal effectiveness than can be expected from a consideration of the activity of the components used separately.

Several different types of compositions containing the compounds of the invention have been developed so that they can be used to greatest advantage as herbicides. These preferred formulations comprise certain wettable powders, certain aqueous or oil suspensions, certain dusts, certain emulsifiable oils, solutions in certain solvents, and certain granules and pellets. In general, these preferred compositions will all usually contain a wetting agent, a dispersant, or an emulsifying agent.

Wettable powders are water-dispersible compositions containing the active material, an inert solid extender, and one or more surfactants to provide rapid wetting and prevent heavy flocculation when suspended in water.

The inert extenders which should be used in the preferred wettable powders of this invention containing the compounds of the invention are preferably of mineral origin and the surfactants are preferably anionic or non-ionic. The classes of extenders most suitable for the wettable powder formulations of this invention are the natural clays, diatomaceous earth, and synthetic mineral fillers derived from silica and silicate. Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Preferred fillers are kaolinites, attapulgite clay and synthetic magnesium silicate. Preferred wetting agents are alkylbenzene and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylenic glycols, and ethers of polyethylene glycol with long chain alcohols and phenols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium-N-methyl-N-(long chain acid) taurates.

Wetting and dispersing agents in these preferred wettable powder compositions are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations will contain from about 25 to 90 weight percent active material, from 0.5 to 3.0 weight percent wetting agent, from 0.25 to 5.0 weight percent dispersant, and from 2 to 74.25 weight percent inert extender, as these terms are described above.

Aqueous suspensions are prepared by mixing together and sandgrinding or ball milling an aqueous slurry of water-insoluble active ingredient in the presence of dispersing agents to obtain a concentrated slurry of very finely-divided particles, in which the active ingredient is substantially all below 5 microns in size. The resulting concentrated aqueous suspension is characterized by its extremely small particle size, so that when diluted and sprayed, coverage is very uniform. Thickening agents such as gelling type clays may also be included to further reduce the settling out of particles.

Dusts are dense powder compositions which are intended for application in dry form. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the compounds of this invention, the inert extender may be either of vegetable or mineral origin, the wetting agent is preferably anionic or non-ionic, and suitable absorptive grinding aids are of mineral origin.

Suitable classes of inert solid extenders for use here are those organic or inorganic powders which possess high bulk density and are very free-flowing. They are also characterized by possessing relatively low surface areas and are poor in liquid absorption. Suitable classes of grinding aids are some natural clays, diatomaceous earths, and synthetic mineral fillers derived from silica or silicates. Among ionic and non-ionic wetting agents, the most suitable are the members of the group known to the art as wetting agents and emulsifiers. Although solid agents are preferred because of ease in incorporation, some liquid non-ionic agents are also suitable in this invention.

Preferred inert solid extenders for dust formulations are micaceous talcs, pyrophyllite, dense kaolin clays, ground calcium phosphate rock such as that known as "Phosphodust" (a trademark of the American Agricultural Chemical Company) and tobacco dust.

Preferred grinding aids are attapulgite clay, diatomaceous silica, synthetic fine silica and synthetic calcium and magnesium silicates. Preferred wetting agents are those previously listed under wettable powder formulations.

The inert solid extenders for these dust formulations are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above may also be used in the preparation of dusts. While such wettable powders could be used directly in dust form, it is more advantageous to dilute them by blending with the dense dust diluent. In this manner, dispersing agents, corrosion inhibitors, and the anti-foam agents may also be found as components of a dust.

Thus, the dust compositions will comprise about 2 to 20 weight percent active material, 0 to 50 weight percent absorptive filler, 0 to 1.0 weight percent wetting agents, and about 30 to 98 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

Emulsifiable oils are usually solutions or suspensions of active material in non-water miscible solvents together with a surfactant.

For the compounds of this invention, emulsifiable oil solutions can be made by mixing the active ingredient with a solvent and surfactant. Suitable solvents for the compounds of this invention are hydrocarbons (substituted or unsubstituted), and non-water miscible ethers, esters, or ketones. Suitable surfactants are those anionic or non-ionic agents known to the art as emulsifying agents. Such compounds can be found listed in "Detergents and Emulsifiers Annual 1965" by J. W. McCutcheon, Inc.

Emulsifying agents most suitable for the compositions hereof are alkyl and alkylaryl polyethoxy alcohols, polyoxyethylene sorbitol or sorbitan fatty acid esters, fatty acid alkylol amide condensates, amine salts of fatty alcohol sulfates plus long chain alcohols and oil soluble petroleum sulfonates. Such emulsifying agents will comprise from about 3 to 10 weight percent of the total composition. As described above, however, up to 4 parts of emulsifying agent for each part of active compound can be used to give synergistic results.

Preferred solvents included hydrocarbons of the aromatic type such as xylene and heavy aromatic naphthas, and ketones such as isophorone.

Thus, emulsifiable oil compositions will usually consist of from about 15 to 50 weight percent active material, about 2 to 10 weight percent emulsifier, as these terms are defined and used above.

Oil suspensions consist of finely divided active ingredient dispersed in non-solvent organic liquids, e.g., those in which the dispersed active has a solubility of less than about 0.1% at room temperature. Other ingredients which may be present in such compositions are surface active agents, and thickeners. Such compositions can be prepared by blending finely divided active ingredient into the non-solvent liquid and dispersing the material by application of shear, or by sand-milling or ball-milling the active ingredient with a non-solvent carrier. Preferred as such carriers are certain aliphatic hydrocarbons, kerosene, diesel oil, fuel oil, and the like. Surface active agents may be the same as described above for emulsifiable oil solutions. The thickeners can include hydrophobed clays, heavy metal soaps, and the like. Such oil suspensions can consist of 15–60% active ingredient, 0–10% surface active agent, 0–5% thickener, and 25–85% of oil. The oil suspension can be used either by emulsifying the mix into water, or by extending the concentrate with more oil to form dilute sprays.

Granules or pellets are physically stable, particulate compositions containing a compound of Formula 1 adhering to or distributed through a basic matrix of a coherent, inert carrier with macroscopic dimensions. In order to aid leaching of active from the granule, a surfactant is usually present.

For the compounds of this invention, the inert carrier is preferably of mineral origin, and the surfactant is a compound known to the art as a wetting agent, such as the ones described above.

Suitable carriers are natural clays, some pyrophyllites and vermiculite. Suitable wetting agents are anionic or non-ionic.

For granule compositions, the most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second suitable types are initially powdered kaolin clays, hydrated attapulgite, or betonitic clays, either sodium, calcium or magnesium betonites. These are blended with the active components to give mixtures that are granulated and dried to yield granular material with the active component distributed uniformly throughout the mass. Such granules can also be made with 20 to 30 weight percent active component, but more frequently a concentration of about 10 weight percent is desired for optimum distribution. The granular compositions of this invention are most useful in a size range of 15–30 mesh.

The most suitable wetting agents for the granular compositions depend upon the type of granule used. When preformed granules are sprayed with active material in liquid form, the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitol or sorbitan fatty acid esters, polyethylene glycol fatty esters, fatty alkylol amide condensates and oil soluble petroleum or vegetale oil sulfonates. Such agents will usually comprise from about 0 to 5 weight percent of the total composition.

When the active is first mixed with a powdered carrier and subsequently granulated, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular formulations comprise about 15 to 30 mesh granules containing from about 5 to 30 weight percent active material, about 0 to 5 weight percent wetting agent, and about 65 to 95 weight percent inert carrier, as these terms are used herein.

Pellets can be made by making the finely divided uracils of this invention with suitable clays along with such optional ingredients as anhydrous salts, wetting agents, and dispersing agents. This mixture is moistened with 10–25% by weight of water an is then extruded through a suitable die, under pressure. The extrusions are cut into pre-determined lengths and then dried. These pellets can be granulated, if desired.

The preferred pellet formulation of this invention will contain from 0.5–30% of the active material, from 5–15% of anhydrous sodium sulfate, from 0.5–5.0% of surface active agents and from 50–94% of clay diluent.

The herbicidal uracils of this invention can be combined with other known herbicides to give compositions which have advantages over the individual components.

Among the known herbicides which can be combined with the compounds of this invention are:

SUBSTITUTED UREAS 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
3-(p-chlorophenoxyphenyl)-1,1-dimethylurea These ureas can be mixed with the uracils of this invention in proportions of from 1:4 to 4:1, respectively, the preferred ratio being 1:2 to 2:1.

SUBSTITUTED TRIAZINES 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine 2-methoxy-4-ethylamino-6-isopropylamino-s-triazine
2-methylmercapto-4-(2-methoxyethylamino)-6-isopropylamino-s-triazine These triazines can be mixed with the uracils of this invention in proportions of from 1:4 to 4:1, respectively, the preferred ratio being 1:2 to 2:1.

PHENOLS

Dinitro-o(sec-butyl)phenol and its salts
Pentachlorophenol and its salts

These phenols can be mixed with the uracils of this invention in the proportions of 1:10 to 10:1, respectively, the preferred ratio being 1:5 to 5:1.

CARBOXYLIC ACIDS AND DERIVATIVES

The following carboxylic acids and derivatives can be mixed with the uracils of this invention in the listed respective proportions:

A 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
2-(2,4,5-trichlorophenoxy)ethyl-2,2-dichloropropionate
4-(2,4-dichlorophenoxy)butyric acid and its salts and esters
4-(2-methyl-4-chlorophenoxy)butyric acid and its salts and esters
2,3,6-trichlorobenzyloxypropanol Mixed in a 1:20 to 8:1 ratio, preferably a 1:8 to 4:1 ratio.

B. 2,6-dichlorobenzonitrile

Mixed in a 1:4 to 4:1 ratio, preferably a 1:3 to 3:1 ratio.

C. Trichloroacetic acid and its salts

Mixed in a 1:4 to 25:1 ratio, preferably a 1:2 to 10:1 ratio.

D. 2,2-dichloropropionic acid and its salts

Mixed in a 1:4 to 10:1 ratio, preferably a 1:2 to 5:1 ratio.

E

N,N-di(n-propyl)thiolcarbamic acid, ethyl ester
N,N-di(n-propyl)thiolcarbamic acid, n-propyl ester
N-ethyl-N-(n-butyl)thiolcarbamic acid, ethyl ester
N-ethyl-N-(n-butyl)thiolcarbamic acid, n-propyl ester Mixed in a 1:2 to 24:1 ratio, preferably a 1:1 to 12:1 ratio.

F

N-phenylcarbamic acid, isopropyl ester
N-(m-chlorophenyl)carbamic acid, isopropyl ester
N-(m-chlorophenyl)carbamic acid, 4-chloro-2-butynyl ester
N-(3,4-dichlorophenyl)carbamic acid, methyl ester Mixed in a 1:2 to 24:1 ratio, preferably a 1:1 to 12:1 ratio.

G. 2,3,6-trichlorophenylacetic acid and its salts

Mixed in a 1:20 to 8:1 ratio, preferably a 1:4 to 4:1 ratio.

H 2-chloro-N,N-diallylacetamide
Maleic hydrazide

Mixed in a 1:2 to 10:1 ratio, preferably a 1:1 to 5:1 ratio.

INORGANIC AND MIXED INORGANIC-ORGANIC SALTS

The following salts can be mixed with the uracils in the listed respective proportions:

A

Calcium propylarsonate
Disodium monomethylarsonate
Octyl-dodecylammoniummethylarsonate
Dimethylarsinic acid Mixed in a 1:4 to 4:1 ratio, preferably a 1:2 to 2:1 ratio.

B. Sodium arsenite

Mixed in a 1:10 to 40:1 ratio, preferably a 1:5 to 25:1 ratio.

C

Lead arsenate
Calcium arsenate

Mixed in a 150:1 to 600:1 ratio, preferably a 100:1 to 400:1 ratio.

D

Sodium tetraborate hydrated, granulated
Sodium metaborate
Sodium pentaborate
Polychlorborate
Unrefined borate ore such as borascu Mixed in a 3:1 to 1500:1 ratio, preferably a 6:1 to 1000:1 ratio.

E. Sodium chlorate

Mixed in a 1:1 to 40:1 ratio, preferably a 2:1 to 20:1 ratio.

F. Ammonium sulfamate

Mixed in a 1:1 to 100:1 ratio, preferably a 1:1 to 50:1 ratio.

G. Ammonium thiocyanate

Mixed in a 1:10 to 20:1 ratio, preferably a 1:5 to 5:1 ratio.

OTHER ORGANIC HERBICIDES

These herbicides can be mixed with the uracils in the listed respective proportions

A 1,1'-ethylene-2,2'-dipyridylium cation
1,1'-ethylene-4,4'-dipyridylium cation Mixed in a 1:20 to 16:1 ratio, preferably a 1:5 to 5:1 ratio.

B. 3-amino-1,2,4-triazole

Mixed in a 1:20 to 20:1 ratio, preferably a 1:5 to 5:1 ratio.

C. 3,6-endoxohexahydrophthalic acid

Mixed in a 1:4 to 20:1 ratio, preferably a 1:2 to 10:1 ratio.

D

Diphenylacetonitrile
N,N-dimethyl-$\alpha,\alpha$-diphenylacetamide
N,N-di-(n-propyl)-2,6-dinitro-4-trifluoromethylaniline
N,N-di-(n-propyl)-2,6-dinitro-4-methylaniline Mixed in a 1:10 to 30:1 ratio, preferably a 1:5 to 20:1 ratio.

E

O-(2,4-dichlorophenyl)-O-methyl-isopropylphosporamidothioate
2,3,5,6-tetrachloroterephthalic acid, dimethyl ester Mixed in a 1:4 to 20:1 ratio, preferably a 1:3 to 15:1 ratio.

F 2,4-dichloro-4'-nitrodiphenyl ether
2,3,5-trichloro-4-pyridinal
4-amino-3,5,6-trichloropicolinic acid Mixed in a 1:10 to 30:1 ratio, preferably a 1:5 to 20:1 ratio.

OTHER SUBSTITUTED URACILS

The uracils of this invention can be mixed with other substituted uracils, in the respective proportions listed below.

A 3-isopropyl-5-bromo-6-methyluracil
3-isopropyl-5-chloro-6-methyluracil
3-sec-butyl-5-bromo-6-methyluracil
3-sec-butyl-5-chloro-6-methyluracil
3-cyclohexyl-5-bromo-6-methyluracil
3-cyclohexyl-5-chloro-6-methyluracil
3-tert-butyl-5-bromo-6-methyluracil
3-tert-butyl-5-chloro-6-methyluracil
5-chloro-3-cyclohexylmethyl-6-methyluracil
5-bromo-3-(1-ethylpropyl)-6-methyluracil
5-chloro-3-(1-ethylpropyl)-6-methyluracil
5-bromo-3-(1,3-dimethylbutyl)-6-methyluracil Mixed in a 1:4 to 4:1 ratio, preferably a 1:2 to 2:1 ratio.

B 3-cyclohexyl-6-methyluracil
3-fenchyl-6-ethyluracil
3-cyclohexyl-6-sec-butyluracil
3-norbornyl-6-methyluracil
3-cyclopentyl-6-methyluracil
3-cyclohexyluracil Mixed in a 1:4 to 4:1 ratio, preferably a 1:2 to 2:1 ratio.

C 3-isopropyl-5-bromouracil
3-sec-butyl-5-bromouracil
3-sec-butyl-5-methyluracil
3-cyclohexyl-5-bromouracil
3-cyclohexyl-5-chlorouracil Mixed in a 1:4 to 4:1 ratio, preferably a 1:2 to 2:1 ratio.

D 3-cyclohexyl-5,6-trimethyleneuracil
3-sec-butyl-5,6-trimethyleneuracil
3-isopropyl-5,6-trimethyleneuracil
3-cyclohexyl-5,6-tetramethyleneuracil
3-isopropyl-5,6-tetramethyleneuracil Mixed in a 1:4 to 4:1 ratio, preferably a 1:1 to 2:1 ratio.

Many of the above materials, such as borates, arsonates and dinitro-sec-butylphenol also show bactericidal and fungicidal properties. This invention contemplates the mixture of herbicidal uracils with these compounds, or compounds of similar action, for the purpose of destroying the soil microorganisms which would degrade and inactivate the herbicidal uracils.

EXAMPLES

The invention will be better understood from the following examples illustrating the preparation of the compounds of the invention and the preparation and use of herbicidal compositions containing these compounds.

PREPARATION OF COMPOUNDS

*Example 1.—Preparation of 1-acetyl-5-bromo-3-isopropyl-6-methyluracil*

Ketene in nitrogen as a carrier gas is bubbled into 104 parts of 5-bromo-3-isopropyl-6-methyluracil in 1000 parts of acetone at room temperature. A mildly exothermic reaction takes place, after which the resulting solution is concentrated to an oil at room temperature and treated with cold water to give a solid which, after dissolving in ether and washing with 5% sodium hydroxide and with water, drying and recrystallizing from hexane, gives pure 1 - acetyl - 5-bromo-3-isopropyl-6-methyluracil, melting point 69–70°.

The following 1-acetyluracils can be similarly prepared by reacting an equivalent amount of the appropriate substituted uracil and ketene:

1-acetyl-3-cyclohexyl-5,6-dimethyluracil
1-acetyl-5-bromo-3-(1,3-dimethylbutyl)-6-methyluracil
1-acetyl-3-cyclohexyl-5,6-trimethyleneuracil
1-acetyl-5-chloro-3-tert-butyl-6-methyluracil
1-acetyl-5-chloro-3-sec-butyl-6-methyluracil
1-acetyl-5-chloro-6-methyl-3-phenyluracil
1-acetyl-3-isopropyl-5-bromo-6-methyluracil
1-acetyl-5-chloro-3-cyclohexyl-6-methyluracil
1-acetyl-5-bromo-3-sec-butyl-6-methyluracil
1-acetyl-5-bromo-3-tert-butyl-6-methyluracil
1-acetyl-5-bromo-3-cyclohexyl-6-methyluracil
1-acetyl-5-bromo-6-methyl-3-phenyluracil
1-acetyl-5-bromo-3,6-diethyluracil
1-acetyl-5-bromo-3-(1-ethylpropyl-6-methyluracil
1-acetyl-5-bromo-6-methyl-3-[2-(2-methylmonyl)]uracil

*Example 2.—Preparation of 1-trichloromethylthio-3-isopropyl-5-bromo-6-methyluracil*

A solution of 41 parts by weight of sodium hydroxide, 600 parts by weight of water, 470 parts by weight of isopropyl alcohol, and 247 parts by weight of 3-isopropyl-5-bromo-6-methyluracil was stirred and cooled to 6° C. This solution was rapidly stirred and 186 parts by weight of trichloromethanesulfenyl chloride were added. A white solid formed almost immediately.

After the solution had been stirred for 3–5 minutes, crude 1-trichloromethylthio-3-isopropyl-5-bromo-6-methyluracil was filtered off, washed with water, dried, and recrystallized twice from heptane. It was found to have a melting point of 96–100° C. After recrystallization from ethanol, its melting point was 103–105° C.

*Example 3.—Preparation of 1-trichloromethylthio-3-cyclohexyl-6-methyluracil*

A mixture of 104 parts by weight of 3-cyclohexyl-6-methyluracil, 235 parts by weight of isopropyl alcohol, 300 parts by weight of water, and 20.5 parts by weight of sodium hydroxide was stirred until the solids were dissolved. The solution was then cooled to 10° C. and 93 parts by weight of trichloromethanesulfenyl chloride were added.

The 3 - cyclohexyl-6-methyl-1-(trichloromethylthio)-uracil precipitated almost immediately. It was filtered, dried, and recrystallized from a mixture of ethanol and water and had a melting point of 129–131° C.

The following uracils can be prepared in a similar fashion by substituting an equivalent amount of the indicated uracil and the appropriate sulfenyl chloride for the substituted uracils and trichloromethanesulfenyl chloride of Examples 2 and 3:

The following 1-formyl substituted uracils can be similarly prepared by substituting an equivalent amount

| Uracil Reactant | Uracil Product |
|---|---|
| 5-chloro-3-(1-ethylpropyl)-6-methyluracil | 5-chloro-3-(1-ethylpropyl)-6-methyl-1-(trichloromethylthio)uracil. |
| 5-bromo-3-sec-butyl-6-methyluracil | 5-bromo-3-sec-butyl-6-methyl-1-(trichloromethylthio)uracil. |
| 5-bromo-3-tert-butyl-6-methyluracil | 5-bromo-3-tert-butyl-6-methyl-1-(trichloromethylthio)uracil. |
| 5-bromo-3-sec-hexyl-6-methyluracil | 5-bromo-3-sec-hexyl-6-methyl-1-(trichloromethylthio)uracil. |
| 5-bromo-3-cyclohexyl-6-methyluracil | 5-bromo-3-cyclohexyl-6-methyl-1-(trichloromethylthio)uracil. |
| 5-chloro-3-cyclopentyl-6-methyluracil | 5-chloro-3-cyclopentyl-6-methyl-1-(trichloromethylthio)uracil. |
| 5-bromo-3-cycloheptenyl-6-methyluracil | 5-bromo-3-cycloheptenyl-6-methyl-1-(trichloromethylthio)uracil. |
| 5-bromo-3-cyclooctyl-6-methyluracil | 5-bromo-3-cyclooctyl-6-methyl-1-(trichloromethylthio)uracil. |
| 5-chloro-3-sec-butyl-6-ethyluracil | 5-chloro-3-sec-butyl-6-ethyl-1-(trichloromethylthio)uracil. |
| 5-chloro-6-methyl-3-isopropyluracil | 5-chloro-6-methyl-3-isopropyl-1-(trichloromethylthio)uracil. |
| 5-bromo-3-(1-ethylpropyl)-6-methyluracil | 5-bromo-3-(1-ethylpropyl)-6-methyl-1-(trichloromethylthio)uracil. |
| 5-chloro-3-cyclohexenyl-6-methyluracil | 5-chloro-3-cyclohexenyl-6-methyl-1-(trichloromethylthiouracil. |
| 5,6-dimethyl-3-cyclohexyluracil | 5,6-dimethyl-3-cyclohexyl-1-(trichloromethylthio)uracil. |
| 5,6-dimethyl-3-sec-butyluracil | 5,6-dimethyl-3-sec-butyl-1-(trichloromethylthio)uracil. |
| 3-isopropyl-5,6-trimethyleneuracil | 3-isopropyl-5,6-trimethylene-1-(trichloromethylthio)uracil. |
| 3-cyclohexyl-5,6-trimethyleneuracil | 3-cyclohexyl-1-trichloromethylthio-5,6-trimethyleneuracil. |
| 3-(3-amyl)-5-bromo-6-methyluracil | 3-(3-amyl)-5-bromo-6-methyl-1-trichloromethylthiouracil. |
| 5-chloro-3-(1,3-dimethylbutyl)-6-methyluracil | 5-chloro-3-(1,3-dimethylbutyl)-6-methyl-1-trichloromethylthiouracil. |
| 5-bromo-6-methyl-3-(2-methylcyclopropyl)uracil | 5-bromo-6-methyl-3-(2-methylcyclopropyl)-1-(trichloromethylthio)uracil. |
| 5-bromo-3-(4-methoxycyclohexyl)-6-methyluracil | 5-bromo-3-(4-methoxycyclohexyl)-6-methyl-1-(trichloromethylthio)uracil. |
| 3-cyclobutenyl-5,6-dimethyluracil | 3-cyclobutenyl-5,6-dimethyl-1-(trichloromethylthio)uracil. |
| 3-cyclododecenyl-5,6-dimethyluracil | 3-cyclododecenyl-5,6-dimethyl-1-(trichloromethylthio)uracil. |
| 3-norbornyl-5-bromo-6-methyluracil | 3-norbornyl-5-bromo-6-methyl-1-(trichloromethylthio)uracil. |
| 3-phenyl-5-bromo-6-methyluracil | 3-phenyl-5-bromo-6-methyl-1-(trichloromethylthio)uracil. |
| 5-chloro-6-methyl-3-phenyluracil | 5-chloro-6-methyl-3-phenyl-1-(trichloromethylthio)uracil. |
| 3-(3α,4,5,6,7,7α-hexahydro-4,7-methano-5-indenyl)-5,6-dimethyluracil | 3-(3α,4,5,6,7,7α-hexahydro-4,7-methano-5-indenyl)-5,6-dimethyl-1-(trichloromethylthio)uracil. |
| 5-chloro-3-sec-butyl-6-methyluracil | 5-chloro-3-sec-butyl-6-methyl-1-(trichloromethylthio)uracil. |
| 5-chloro-3-tert-butyl-6-methyluracil | 5-chloro-3-tert-butyl-6-methyl-1-(trichloromethylthio)uracil. |
| 5-bromo-3-(1,3-dimethylbutyl)-6-methyluracil | 5-bromo-3-(1,3-dimethylbutyl)-6-methyl-1-(trichloromethylthio)uracil. |
| 3-(2-amyl)-5-bromo-6-methyluracil | 3-(2-amyl)-5-bromo-6-methyl-1-(trichloromethylthio)uracil. |

*Example 4.—Preparation of 1-benzoyl-3-(n-amyl)-5-bromo-6-methyluracil*

To a stirred anhydrous solution of 275 parts by weight of 3-(n-amyl)-5-bromo-6-methyluracil in 1000 parts by weight of dioxane, under a nitrogen blanket, is gradually added 48 parts by weight of sodium hydride (55% active in mineral oil). The formation of this sodium derivative is followed by the evolution of hydrogen.

When hydrogen ceases to be evolved, the sodium salt suspension is heated to reflux and stirred as 140 parts by weight of benzoyl chloride is gradually added. Refluxing is continued until the reaction is complete.

After cooling, the solution is cautiously diluted with water to precipitate the product, which is then filtered, washed with cold pentane to remove the mineral oil, and dried.

*Example 5.—Preparation of 1-benzoyl-5-bromo-3-sec-butyl-6-methyluracil*

One part of anhydrous 5-bromo-3-sec-butyl-6-methyluracil sodium salt is added to two parts of benzoyl chloride and heated with stirring for approximately 15 minutes at 200–220°. The mixture is cooled and 8 parts of 0.2 m. sodium hydroxide is added with stirring. After a short time the oil solidifies, is filtered, washed with water and then cyclohexane. After drying the 1-benzoyl-5-bromo-3-sec-butyl-6-methyluracil melts at 112–114°.

The following compounds can be similarly prepared by substituting equivalent amounts of the corresponding uracil and acyl halide starting reactants for the 3-(n-amyl)-5-bromo-6-methyluracil and benzoyl chloride:

of an appropriate substituted uracil for 3-isopropyl-5-bromo-6-methyluracil:

3-sec-butyl-1-formyl-5-bromo-6-methyluracil
3-sec-butly-1-formyl-5-chloro-6-methyluracil
3-cyclohexyl-1-formyl-5-iodo-6-methyluracil
3-isopropyl-1-formyl-5,6-trimethyluracil

HERBICIDAL PREPARATIONS

*Example 6*

Oil Suspension: Percent
5 - fluoro - 3 - cyclohexyl - 6 - methyl - 1 - (trichloromethylthio)uracil _____ 40
Soya lecithin _____ 3
Substantially aliphatic, low viscosity mineral oil, e.g., kerosene or diesel oil _____ 57

The oil suspension is prepared by pregrinding the active material and mixing it with the other components with agitation, or by blending all the components together, then pebble-milling or sand-milling them to reduce the particle size of the active component. The product is suitable for dilution with weed oils to form an oil spray.

This formulation is diluted with 80 gallons of a herbicidal oil such as Lion Herbicidal Oil No. 6 and applied at 12 pounds of active ingredient per acre for general overall weed control along cyclone fences and railroad ballast.

Good control is obtained for several months. Quack grass, pigweed, ryegrass, mustard, foxtail, flower-of-an-hour, cheat, witch grass, buttonweed and jimson weed are controlled.

| Uracil Reactant | Acylating Agent | Uracil Product |
|---|---|---|
| 3-sec-butyl-5,6-dimethyluracil | (2,6-dichlorophenyl)acetyl chloride | 3-sec-butyl-1-(2,6-dichlorophenylacetyl)-5,6-dimethyluracil. |
| 5-chloro-3-tert-butyl-6-methyluracil | Benzoyl chloride | 1-benzoyl-5-chloro-3-tert-butyl-6-methyluracil. |
| 5-bromo-3-cyclohexyl-6-methyluracil | do | 1-benzoyl-5-bromo-3-cyclohexyl-6-methyluracil. |
| Do | 2,3,6-trichlorobenzoyl chloride | 5-bromo-3-cyclohexyl-6-methyl-1-(2,3,6-trichlorobenzoyl)uracil. |
| 3-cyclohexyl-6-methyluracil | do | 3-cyclohexyl-6-methyl-1-(2,3,6-trichlorobenzoyl)uracil. |
| Do | Benzoyl chloride | 1-benzoyl-3-cyclohexyl-6-methyluracil. |
| 3-isopropyl-5,6-trimethyleneuracil | Propionyl chloride | 1-propionyl-3-isopropyl-5,6-trimethyleneuracil. |
| 3-cyclohexyl-5,6-trimethyleneuracil | 2,4-dichlorophenoxyacetyl chloride | 3-cyclohexyl-1-(2,4-dichlorophenoxymethyl)-5,6-trimethyleneuracil. |
| 5-bromo-3-sec-octyl-6-methyluracil | Benzoyl chloride | 1-benzoyl-5-bromo-3-sec-octyl-6-methyluracil. |
| 5-bromo-3-cyclohexyl-6-methyluracil | Propionyl chloride | 5-bromo-3-cyclohexyl-6-methyl-1-propionyluracil. |
| 5-bromo-3-isopropyl-6-methyluracil | (2,3,6-trichlorophenyl)acetyl chloride | 5-bromo-3-isopropyl-6-methyl-1-(2,3,6-trichlorophenylacetyl)uracil. |
| 5-bromo-3-sec-butyl-6-methyluracil | Octanoyl chloride | 5-bromo-3-sec-butyl-6-methyl-1-octanoyluracil. |
| Do | Decanoyl chloride | 5-bromo-3-sec-butyl-1-decanoyl-6-methyluracil. |
| 5-bromo-3-cyclopropyl-6-methyluracil | 2,2-dichloropropionyl chloride | 5-bromo-3-cyclopropyl-1-(2,2-dichloropropionyl)-6-methyluracil. |
| 5-bromo-3-cyclododecyl-6-methyluracil | Chloroacetyl chloride | 5-bromo-1-chloroacetyl-3-cyclododecyl-6-methyluracil. |
| 5-bromo-1,6-dimethyluracil | 2,2-dichloropropionyl chloride | 5-bromo-1-(2,2-dichloropropionyl)-1,6-dimethyluracil. |

Other compounds which give good weed control when formulated and used in this fashion are:

1-acetyl-3-cyclohexyl-5-bromo-6-methyluracil
1-acetyl-3-(sec-butyl)-5-chloro-6-methyluracil
3-isopropyl-5-chloro-6-methyl-1-trichloroacetyluracil
3 - (tert-butyl) - 5 - chloro - 6 - methyl - 1 - (trichloromethylthio)uracil

*Example 7*

| Oil Solution: | Percent |
|---|---|
| 3 - sec - butyl - 1 - (trichloromethylthio) - 5 - bromo - 6 - methyluracil | 20 |
| Pentachlorophenol | 10 |
| Xylene | 70 |

The solids are dissolved in the xylene.

This oil solution controls weeds in oil tank yards. When extended with 60 gallons of herbicidal oil and applied in this volume at the rate of 20 pounds of active ingredients per acre, this combination gives excellent control of a rank growth of herbaceous broadleaved and grass weeds such as ragweed, pigweed, lamb's quarters, fall panicum, crab grass, giant foxtail, barnyard grass, goldenrod, smartweed, and Johnson grass. Using a similar formulation and rate of 5 - bromo - 3 - (1 - ethyl propyl) - 6 - methyl - 1 - (trichloromethylthio)uracil as shown above similar herbicidal utility can be obtained.

*Example 8*

| Oil Solution: | Percent |
|---|---|
| 5 - bromo - 3 - (1,3 - dimethylbutyl) - 6 - methyl - 1 - (trichloromethylthio)uracil | 25 |
| Methyl isoamyl ketone | 50 |
| Alkylated naphthalene, principally α-methyl naphthalene | 25 |

These ingredients are combined and agitated until a homogeneous solution is obtained.

Eight to twelve gallons of this preparation are mixed with 65 gallons of herbicidal oil and applied along access trails in a park. The application covers one acre and is applied as the weeds reach a height of 2 to 6 inches.

Such annual weeds as crab grass, chickweed, Russian thistle, cheat grass and the foxtails are controlled.

The following uracils can be similarly formulated, and when used in equivalent amounts, will give similar results:

1-acetyl-5-bromo-3-(1,3-dimethylbutyl)-6-methyluracil
1-acetyl-5-chloro-3-(1,3-dimethylbutyl)-6-methyluracil
3 - (3 - amyl) - 5 - chloro - 6 - methyl - 1 - (trichloromethylthio)uracil
5 - bromo - 3 - tert - butyl - 6 - methyl - 1 - (trichloromethylthio)uracil
5 - chloro - 3 - (1,3 - dimethylbutyl) - 6 - methyl - 1 - (trichloromethylthio)uracil

*Example 9*

| Emulsifiable oil suspension: | Percent |
|---|---|
| 3 - cyclohexyl - 5,6 - dimethyl - 1 - (trichloromethylthio)uracil | 25 |
| Blend of polyalcohol carboxylic esters and oil-soluble petroleum sulfonates | 6 |
| Diesel oil | 69 |

These components are mixed together and milled in a roller mill, pebble mill, or sand mill until the particles of the active component are below 10 microns in size. The resulting suspension can be emulsified in water or diluted further with weed oils for spray application.

This formulation is diluted with 60 gallons of Lion Herbicidal Oil No. 6 and applied at 10–15 pounds of active ingredient per acre for the control of morning glory, yarrow, ragweed, wild carrot, quack grass, witch grass, perennial rye grass, pigweed, wild mustard, foxtail, flower-of-an-hour, crab grass, and oak and maple seedlings growing along railroad rights-of-way. Excellent control is obtained.

The following compounds can be formulated and used in the same fashion:

5 - bromo - 3 - sec - butyl - 6 - methyl - 1 - (2,3,6 - trichlorophenylacetyl)uracil
5,6 - dimethyl - 3 - isopropyl - 1 - (2,4 - dichlorophenoxyacetyl)uracil
5 - chloro - 3 - fenchyl - 6 - methyl - 1 - (trichloroacetyl)uracil
5 - chloro - 6 - methyl - 3 - isopropyl - 1 - (trichloromethylthio)uracil
1-acetyl-5-bromo-3-tert-butyl-6-methyluracil

SOLID PREPARATIONS

*Example 10*

An 80% wettable powder is prepared by blending and micropulverizing the following compositions:

| Tank Mix: | Percent |
|---|---|
| 3 - sec - butyl - 1 - (trichloromethylthio) - 5 - bromo-6-methyluracil | 80.00 |
| Polyoxyethylated tall oil | 3.00 |
| Low viscosity methyl cellulose | 0.25 |
| Attapulgite clay | 16.75 |

This wettable powder, at 8 pounds of active ingredient, is tank-mixed, in 100 gallons of water, with 6 pounds of 2,3,6-trichlorobenzoic acid, dimethyl amine salt in 3 gallons of water. The mixture is sprayed at a volume rate of 200 gallons per acre on a mixed population of noxious weeds and brush to give good control of bindweed, leafy spurge, Canada thistle, trumpet creeper, honeysuckle, poison ivy, quack grass, and panic grass.

*Example 11*

| Oil-Dispersible Powder: | Percent |
|---|---|
| 3 - cyclohexyl - 1 - (trichloromethylthio) - 5 - chloro-6-methyluracil | 40 |
| 3-amino-1,2,4-triazole | 10 |
| Mixed polyalcohol carboxylic acid esters and oil-soluble sulfonates | 5 |
| Attapulgite clay | 45 |

These components are blended and micropulverized.

Fifteen pounds of active ingredients, dispersed in 100 gallons of diesel oil and sprayed on an acre gives excellent control of Canada thistle, poison ivy, spurge, quack grass, barnyard grass, ragweed, flower-of-an-hour, dewberry, crab grass, and vetch.

*Example 12*

| Wettable Powder: | Percent |
|---|---|
| 3 - cyclohexyl - 1 - (trichloromethylthio) - 5 - bromo-6-methyluracil | 40.00 |
| 3-(3,4-dichlorophenyl)-1,1-dimethylurea | 40.00 |
| Alkyl naphthalene sulfonic acid, Na salt | 1.75 |
| Partially desulfonated sodium lignin sulfonate | 1.50 |
| Attapulgite clay | 16.75 |

The above components are blended, micropulverized, and reblended.

This wettable powder, dispersed in water to give a concentration of 20 pounds of active ingredients per 100 gallons, provides a spray mixture that is outstanding for controlling weeds around industrial warehouses. The spray mixture is applied at 150 gallons per acre and gives good control of smartweed, witchgrass, velvet leaf, sow thistle, ragweed, pigweed, crapetweed, crab grass, annual morning glory, and broomsedge. The area remains free of weeds for an extended period.

Example 13

Wettable Powder: Percent
- 3 - isopropyl - 1 - (trichloromethylthio) - 5 - bromo-6-methyluracil _____ 50
- 2 - methylmercapto - 4 - ethylamino - 6 - isopropylamino-s-triazine _____ 25
- Polyoxyethylated tall oil ester _____ 3
- Partially desulfonated Ca lignin sulfonate _____ 1
- Calcined, nonswelling montmorillonoid clay (Pikes Peak clay) _____ 21

These components are blended and micropulverized.

This composition is applied at the rate of 20 pounds of active ingredients per acre in 150 gallons of water to a railroad ballast area. Excellent control of quack grass, mustard, flower-of-an-hour, butttonweed, pigweed, ragweed, annual ryegrass, bromegrass, henbit, goldenrod, asters, and foxtail is obtained. The ballast remains free of weeds for an extended period.

Example 14

A wettable powder is prepared from the following ingredients by blending and then micropulverizing them until all of the particles are below 50 microns in diameter. They are then reblended.

Wettable Powder: Percent
- 3 - cyclohexyl - 5 - iodo - 6 - methyl - 1 - (trichloromethylthio)uracil _____ 50.00
- Alkylnaphthalene sulfonic acid, sodium salt __ 1.75
- Low viscosity methyl cellulose _____ 0.25
- Calcined, non-swelling montmorillonoid-type clay (Pikes Peak clay) _____ 48.00

This composition is useful for soil-foliage application to seedling tender annual weeds.

For use 2 to 4 pounds of the formulation are added, with stirring, to 40 gallons of water containing 2½ pounds of trimethyl nonyl polyethylene glycol ether. The resulting suspension, when applied as a soil-foliage spray to the parking area of a drive-in theater, gives good control of annual weeds such as crab grass, foxtail, and chickweed.

Example 15

Granules: Percent
- 3-sec-butyl-1-acetyl-5-bromo-6-methyluracil __ 12.5
- 2,4-dichlorophenoxyacetic acid, Na salt _____ 12.5
- Sodium sulfate, anhydrous _____ 10.0
- California sub-bentonite _____ 65.0

These components are blended, micropulverized, moistened with 15–20% water, moist-granulated, dried, and screened to 8–50 mesh.

The granules are distributed along the edges of freshwater lakes and brackish inlets at the rate of about 3 pounds per 1000 square feet. Good control of Eurasian water milfoil is obtained.

Example 16

Granules: Percent
- 5-bromo - 3 - isopropyl-6-methyl-1-(trichloromethylthio)uracil _____ 2.00
- Alkyl naphthalene sulfonic acid, Na salt ____ 0.02
- Sodium chlorate 40%, sodium metaborate 60% _____ 97.98

The mixture of sodium chlorate and sodium metaborate is placed in a rotating drum. The uracil and wetting agent are blended, micropulverized, and then slurried in water. This water slurry is sprayed on the tumbling granular mixture.

This formulation is suited for spot applications to noxious, hard-to-kill perennial weeds and brush. The granules, when applied at the rate of about 1.5 pounds per 100 square feet around sign posts, guard rails, bridge abutments, switches, gas vents and meter houses, give excellent control of Johnson grass, bindweed, brambles, poison ivy, ragweed, pigweed, smartweed, Bermuda grass, crab grass, witchgrass, fall panicum, Vasey grass, and morning glory. The area remains free of weeds for an extended period. Infrequent retreatments at lower rates keep the area weed-free indefinitely.

Example 17

Pellets: Percent
- 3 - sec - butyl-1-(trichloromethylthio)-5,6-trimethyleneuracil _____ 25
- Anhydrous sodium sulfate _____ 10
- Sodium lignin sulfonate _____ 10
- Ca, Mg bentonite _____ 55

The components are blended and micropulverized, then moistened with 18–20% water and extruded through die holes. The extrusions are cut as formed to give pellets and then dried.

These pellets are useful for weed control along highway guard rails, around bridges, cyclone fences, and in utility rights-of-way when applied at rates of 15–30 lbs. of active material per acre.

Example 18

Pellets: Percent
- 5 - bromo - 3 - isopropyl-6-methyl-1-(trichloromethylthio)uracil _____ 25
- Alkyl naphthalene sulfonic acid, Na salt _____ 1
- Anhydrous sodium sulfate _____ 10
- Non-swelling montmorillonoid type clay (Pikes Peak clay) _____ 64

The components are blended and micropulverized, then wetted with 18–25% water and extruded through a die. The extrusions are cut into ⅛ inch pellets as they emerge. These pellets are then dried.

This formulation is used for dry application to the soil for control of undesirable woody plants in fence rows and utility rights-of-way. A basal application of one tablespoonful for each inch of trunk diameter on the ground at the base of each brush cluster gives excellent control of birch, box elder, wild cherry, privet, willow, dogwood, oak, sweetgum, poplar, and spruce.

The invention claimed is:

1. A compound selected from the group consisting of

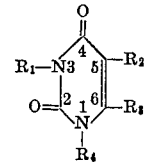

where
$R_1$ is alkyl of 1 through 10 carbon atoms,
  phenyl,
  substituted phenyl wherein said substituent is chlorine, bromine, fluorine, trifluoromethyl, or alkyl of 1 through 5 carbon atoms,
  cycloalkyl of 3 through 12 carbon atoms,
  substituted cycloalkyl of 3 through 12 carbon atoms, wherein said substituent is alkyl of 1 through 4 carbon atoms or methoxy,
  cycloalkenyl of 4 through 12 carbon atoms,
  substituted cycloalkenyl of 4 through 12 carbon atoms wherein said substituent is alkyl of 1 through 4 carbon atoms or methoxy;
$R_2$ is fluorine, chlorine, bromine, iodine, or methyl;
$R_3$ is methyl or ethyl;
$R_4$ is trichloromethylthio, or

wherein
$R_5$ is
  hydrogen,
  alkyl of 1 through 9 carbon atoms,
  chloroalkyl of 1 through 4 carbon atoms, polychloroalkyl of 1 through 4 carbon atoms,
phenyl,
chlorophenyl of 1 through 3 chlorine atoms,
benzyl,
phenoxymethyl, or
chlorophenoxymethyl of 1 through 3 chlorine atoms;

with the provision that $R_2$ and $R_3$ by appropriate loss of hydrogen atoms from alkyl groups can become part of a —$(CH_2)_n$— group to form a ring wherein $n$ is 3.

2. 1-acetyl-5-bromo-3-sec-butyl-6-methyluracil.
3. 1-acetyl-5-chloro-3-tert-butyl-6-methyluracil.
4. 1-acetlyl-5-bromo-3-(1-ethylpropyl-6-methyl)uracil.
5. 5-bromo-3-sec-butyl - 6 - methyl-1-(trichloromethylthio)uracil.
6. 5-chloro-3-tert-butyl - 6 - methyl-1-(trichloromethylthio)uracil.
7. 5-bromo-3-(1-ethylpropyl)-6-methyl - 1 - (trichloromethylthio)uracil.

References Cited

UNITED STATES PATENTS 3,137,698  6/1964  Pfister _____ 260—260

NICHOLAS S. RIZZO, *Primary Examiner.*

F. A. MIKA, *Assistant Examiner.*